United States Patent [19]
Martin

[11] Patent Number: 5,956,907
[45] Date of Patent: Sep. 28, 1999

[54] TORNADO ESCAPE CAPSULE FOR TRAILER HOMES

[76] Inventor: Frank A. Martin, 7008 W. U.S. 20, #66, Michigan City, Ind. 46360

[21] Appl. No.: 09/073,782

[22] Filed: May 6, 1998

[51] Int. Cl.[6] ............................. E02D 1/92; E02D 5/74
[52] U.S. Cl. ............................ 52/169.1; 52/79.9; 52/166; 52/167.1; 52/169.6; 52/DIG. 11; 52/98
[58] Field of Search ................................. 52/79.13, 79.9, 52/166, 169.1, 167.1, 169.6, 170, DIG. 11, 98

[56] References Cited

U.S. PATENT DOCUMENTS

| | | | |
|---|---|---|---|
| 3,042,161 | 7/1962 | Meyer, Jr. ............................. | 52/166 X |
| 3,208,410 | 9/1965 | Hayes et al. ......................... | 52/169.6 X |
| 3,794,277 | 2/1974 | Smedley et al. ..................... | 52/167.1 X |
| 4,126,972 | 11/1978 | Silen . | |
| 4,507,899 | 4/1985 | Janitzky . | |
| 4,615,158 | 10/1986 | Thornton . | |
| 4,622,788 | 11/1986 | Paulsson et al. . | |
| 4,955,166 | 9/1990 | Qualline et al. . | |
| 5,210,985 | 5/1993 | Hsu ........................................ | 52/169.6 |
| 5,354,126 | 10/1994 | Pedrego ............................. | 52/167.1 X |
| 5,481,837 | 1/1996 | Minks, Jr. . | |
| 5,600,923 | 2/1997 | Riley ................................. | 52/169.6 X |
| 5,687,512 | 11/1997 | Spoozak et al. ...................... | 52/166 X |
| 5,749,181 | 5/1998 | Bauman ................................ | 52/169.6 |

*Primary Examiner*—Christopher T. Kent
*Assistant Examiner*—Brian E. Glessner
*Attorney, Agent, or Firm*—Henderson & Sturm

[57] ABSTRACT

A tornado escape capsule 10 for a house trailer 100 having a structural framework 101 which defines an interior compartment 102 dimensioned to releasably receive the escape capsule 10 which is connected to a ground engaging anchor 40 by a tether 60 whereby the escape capsule 10 will remain attached to the ground engaging anchor 40 in the event that a tornado destroys the house trailer 100 that originally surrounded the escape capsule 10.

18 Claims, 4 Drawing Sheets

TORNADO ESCAPE CAPSULE FOR TRAILER HOMES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of emergency shelters in general, and in particular to an anchored escape capsule that is built into a house trailer.

2. Description of Related Art

As can be seen by reference to the following U.S. Pat. Nos. 4,126,972; 4,507,899; 4,615,158; 4,622,788; 4,955,166; and 5,481,837, the prior art is replete with myriad and diverse emergency shelter constructions.

While all of the aforementioned prior art constructions are more than adequate for the basic purpose and function for which they have been specifically designed, they are uniformly deficient with respect to their failure to provide a simple, efficient, and practical method of incorporating an emergency shelter within the interior of a house trailer.

As anyone who lives in tornado prone areas of the country is all too well aware, tornadoes appear to have an unnatural affinity to trailer park complexes causing a great deal of death and suffering due to the effect of hundred of mile per hour winds on the relatively flimsy construction of most trailer homes.

As a consequence of the foregoing situation, there has existed a longstanding need for a new and improved emergency shelter construction that can be incorporated into the interior framework of a trailer home to provide a ground anchored escape capsule for the occupants of the trailer home, and the provision of such a construction is a stated objective of the present invention.

BRIEF SUMMARY OF THE INVENTION

Briefly stated, the tornado escape capsule for house trailers that forms the basis of the present invention comprises in general, an escape capsule that is dimensioned to be releasably received in an interior compartment formed by the framework of the house trailer wherein the escape capsule is operatively connected to a ground engaging anchor by a shock absorbing tether.

As will be explained in greater detail further on in the specification, the escape capsule comprises a ruggedly constructed escape capsule housing provided with a lockable access door. The bottom of the escape capsule is dimensioned to be received through an enlarged opening formed in the floor of the house trailer in the event that the house trailer is carried away or otherwise destroyed by a tornado.

In addition, the floor of the house trailer may further be provided with a hinged floor panel dimensioned to receive and temporarily support the bottom of the escape capsule housing. The escape capsule housing may also be provided with a plurality of frangible support elements for releasably suspending the escape capsule housing within the interior compartment of the house trailer.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
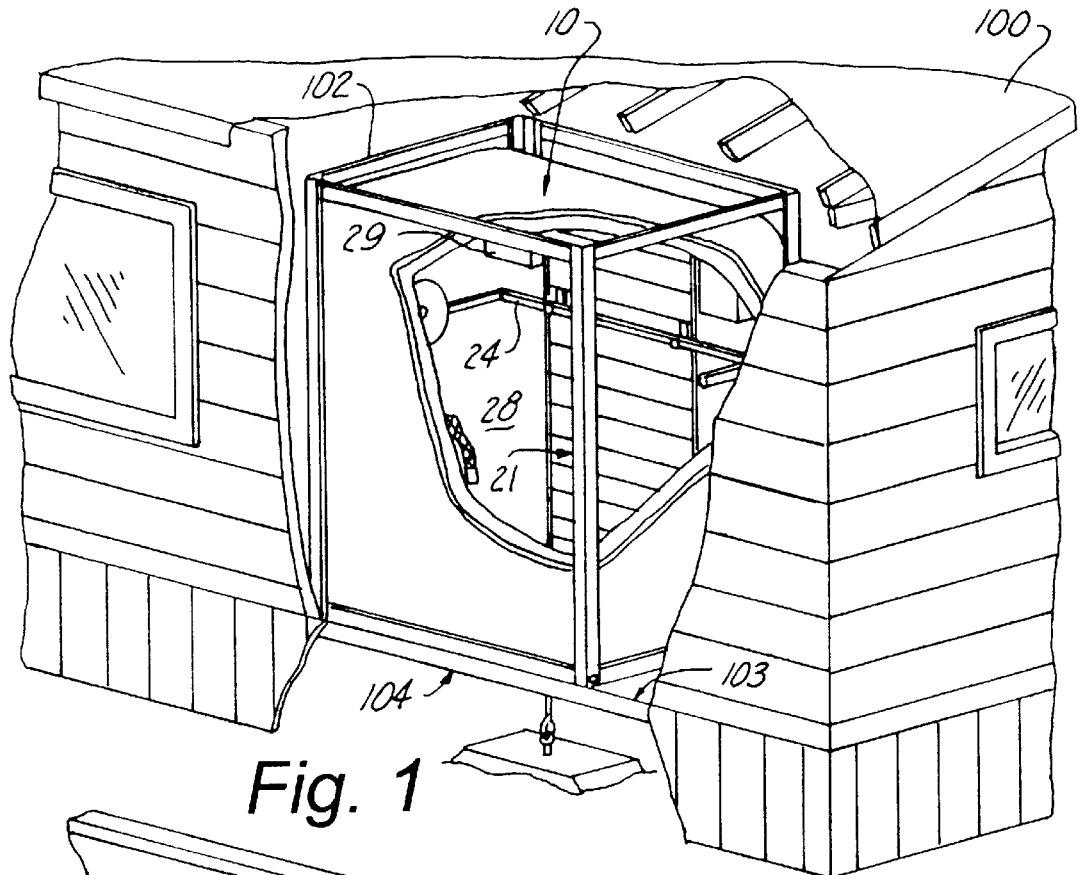
FIG. 1 is a partial cut away view showing the location of the escape capsule within the interior framework of the house trailer.
Figure 2:
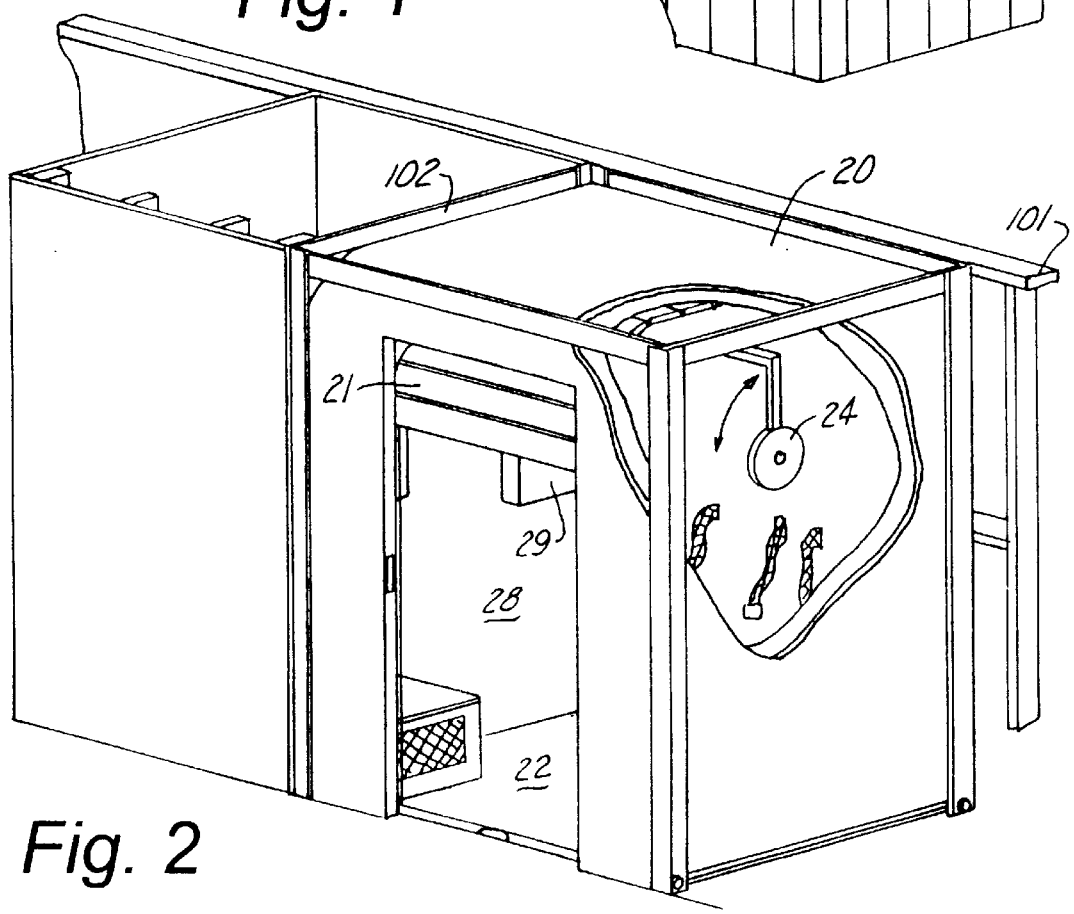
FIG. 2 is a perspective view of the escape capsule within the interior framework.

As can be seen by reference to the drawings, and in particularly to FIGS. 1 and 2, the escape capsule for house trailers that forms the basis of the present invention is designated generally by the reference number 10. Furthermore, the escape capsule 10 is designed and intended to be disposed in the interior of a house trailer 100 having an internal framework 101 that defines a generally rectangular box shaped interior compartment 102 wherein the floor 103 of the house trailer 100 is provided with an enlarged opening 104 positioned beneath the interior compartment 102 for reasons that will be explained presently.

Figure 3:
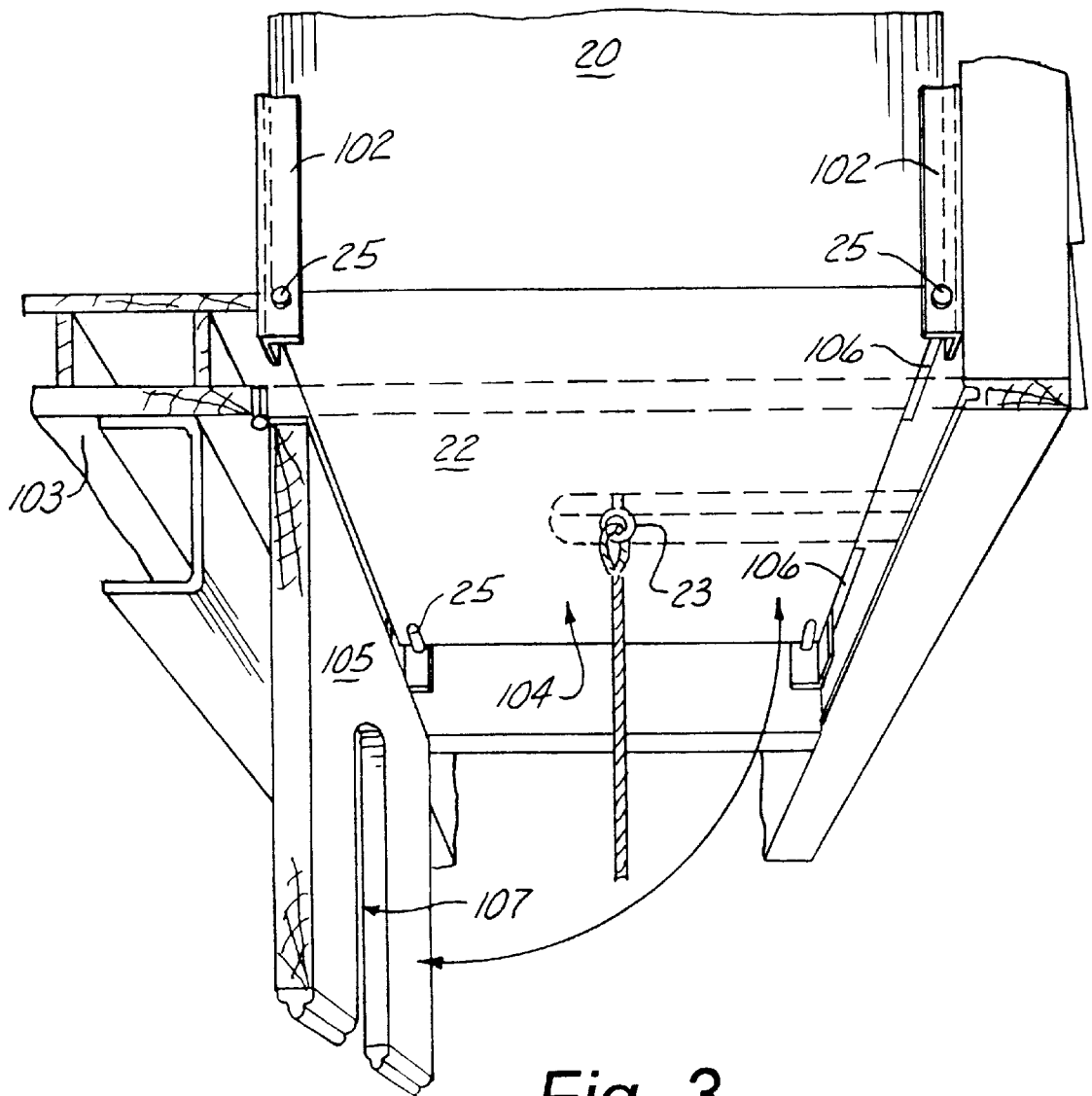
FIG. 3 is a detail view of the cooperation between the escape capsule and the hinged floor panel.
Figure 4:
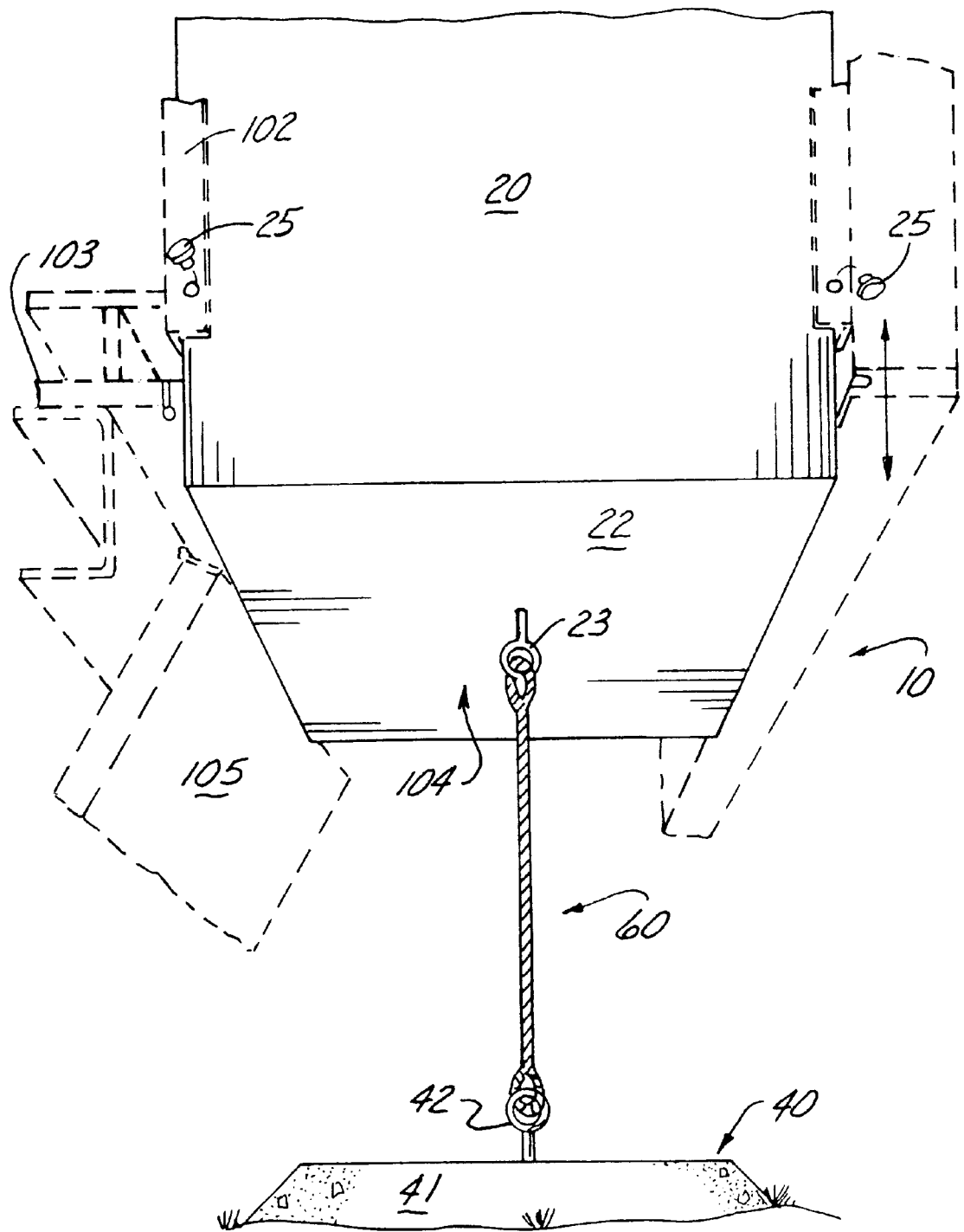
FIG. 4 is an isolated perspective view of the escape capsule, the ground engaging anchor and the tether member.

As can be seen by reference to FIGS. 2 through 4, the escape capsule 10 comprises in general, a ruggedly constructed generally rectangular escape capsule housing 20 having an access door 21 and dimensioned to receive a plurality of individuals, such as the occupants of the house trailer. In addition, the bottom 22 of the escape capsule housing 20 is dimensioned to be received through the enlarged opening 104 in the floor of the house trailer 100 and is further provided with a recessed eyelet 23 whose purpose and function will be explained further on in the specification.

As shown in FIGS. 2 through 4, the interior of the access door 21 is provided with a locking mechanism 24 to secure the access door 21 relative to the escape capsule housing 20 during times of need. The exterior of the escape capsule housing 20 is provided with a plurality of frangible suspension elements 25 for releasably supporting the capsule housing 20 within the interior compartment 102 of the house trailer 100.

In an alternate version of the preferred embodiment depicted in FIG. 3, the enlarged opening 104 in the floor 103 of the house trailer 100 is further provided with a hinged floor panel 105 that is provided with a locking mechanism 106 and is dimensioned to receive and optionally temporarily support the bottom 22 of the capsule housing 21. Furthermore, the hinged floor panel 105 is further provided with a slot 107 whose purpose and function will be explained further on in the specification.

As can also be seen by reference to FIG. 4, the escape capsule 10 also includes a ground engaging anchor 40 including a weighted mass of material 41 disposed beneath the house trailer 100 and provided with an eyelet element 42 positioned below the enlarged opening 104 in the floor 103 of the house trailer 100.

While the weighted mass of material 41 depicted in the drawings is represented as a buried block of concrete, it is to be understood that the mass of material 41 could also comprise buried railroad ties, or even a large concrete pad that the house trailer 100 would rest upon.

Still referring to FIG. 4, it can be seen that the escape capsule 10 also includes a shock absorbing tether member 60 which operatively connects the escape capsule housing 20 to the ground engaging anchor 40 via the eyelets 23 and 42, respectively.

Figures 5, 6:
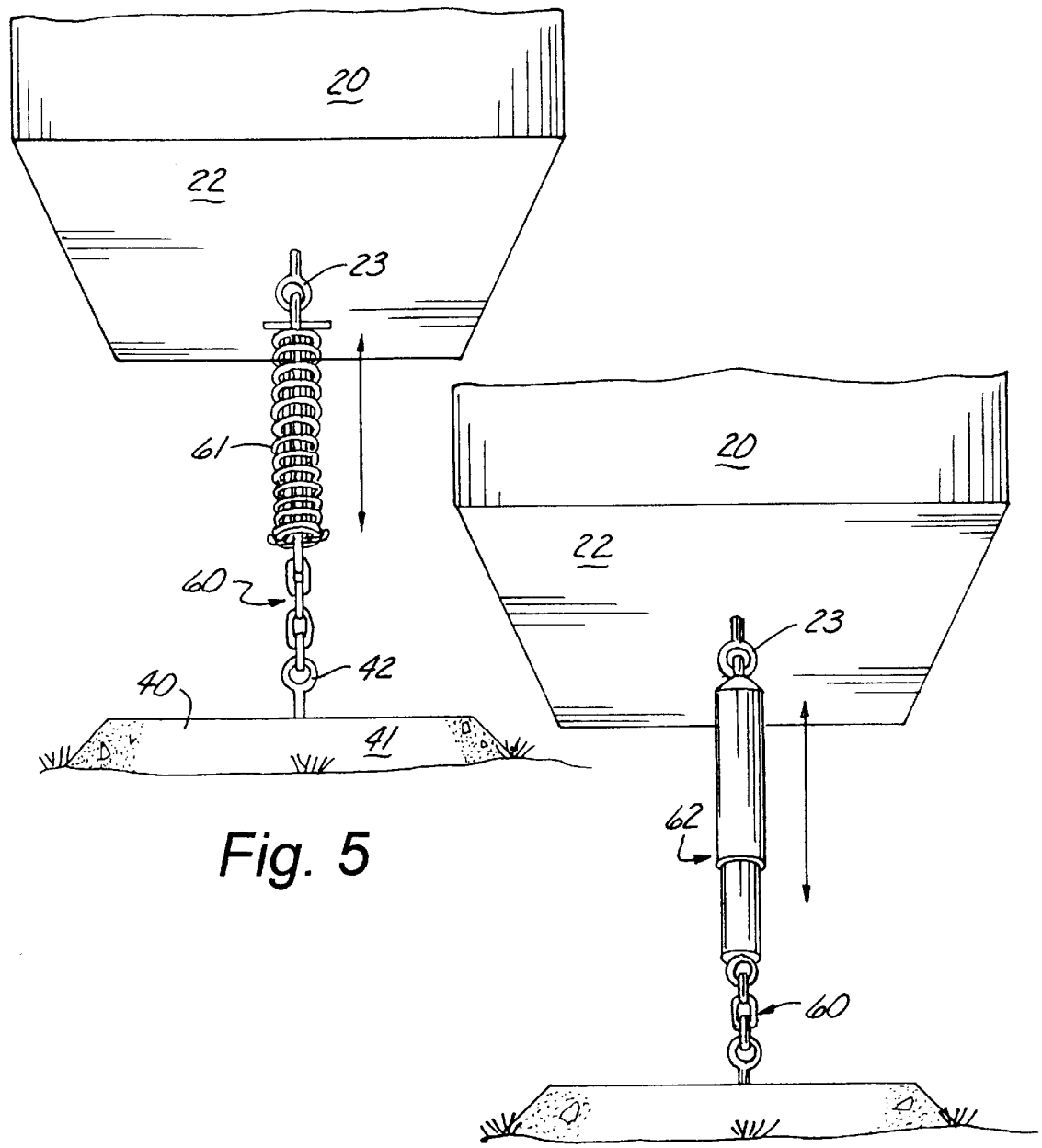
FIG. 5 is an isolated detail view of a spring biased shock absorbing arrangement for the tether member.
FIG. 6 is an isolated detail view of a shock absorbing cylinder operatively associated with the tether member.

In addition, in alternate versions of the preferred embodiment depicted in FIGS. 5 and 6, the tether element 60 may be provided with either a shock absorbing helical spring element 61 or a shock absorbing cylinder 62 to lessen the impact forces imparted to the escape capsule 10 when it is violently and physically separated from the house trailer framework 101 such as when the house trailer 100 is demolished by the winds of a tornado.

It should also be noted at this juncture, that while other emergency shelters are positioned on the outside and/or adjacent to a house trailer, these devices require the occupants to leave the confines of the house trailer to gain access to the shelters thereby exposing the occupants to the potentially deadly effects of airborne debris.

On the other hand, the escape capsule 10 of this invention is completely surrounded by the house trailer framework 101. The house trailer 100 itself must sustain substantial structural damage before the escape capsule 10 becomes physically separated from the house trailer 100 and is totally exposed to the direct effect of the tornado's winds.

To that end, as shown in FIGS. 1 and 2, it is contemplated that the interior of the escape capsule housing 20 is at a minimum provided with a thick layer of padding 28 and under certain circumstances provided with one or more vehicle style airbags 29 that will automatically be inflated to absorb the impact generated on the capsule housing 20 when it is initially separated from the house trailer 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. In a house trailer having a floor and a structural framework defining an internal compartment an improvement comprising:

an opening formed in the floor of the house trailer and positioned directly below said internal compartment;

an escape capsule dimensioned to be received and releasably supported within said internal compartment;

a ground engaging anchor positioned beneath said internal compartment in the house trailer; and tether means operatively connected between said escape capsule and said ground engaging anchor.

2. The improvement as in claim 1 wherein said opening is provided with a hinged floor panel having a slot dimensioned to slidably receive said tether means.

3. The improvement as in claim 1 wherein said escape capsule is provided with an access door.

4. The improvement as in claim 3 wherein said access door is accessible from the interior of the house trailer.

5. The improvement as in claim 3 wherein said access door opens inwardly into the interior of the escape capsule.

6. The improvement as in claim 3 wherein said access door slides downwardly relative to the escape capsule.

7. The improvement as in claim 3 wherein said access door is provided with a locking mechanism.

8. The compartment as in claim 3 wherein the interior of the escape capsule is dimensioned to receive a plurality of individuals.

9. The improvement as in claim 3 wherein the interior of the escape capsule is padded.

10. The improvement as in claim 8 wherein the interior of the escape capsule is provided with cushioning means to prevent injury to the occupants of the escape capsule.

11. A tornado escape capsule for a house trailer having a structural framework defining an internal compartment and a floor provided with an opening disposed beneath said internal compartment wherein the escape capsule comprises:

an escape capsule housing dimensioned to be received within said internal compartment and provided with an access door;

means for releasably supporting the capsule housing within said internal compartment;

a ground engaging anchor positioned beneath said escape capsule; and tether means operatively connected between the escape capsule housing and said ground engaging anchor.

12. The escape capsule as in claim 11 wherein said tether means comprises a tether member secured on one end to the escape capsule housing and secured on the other end to the ground engaging anchor.

13. The escape capsule as in claim 12 wherein said tether member is provided with a shock absorber element.

14. The escape capsule as in claim 13 wherein the shock absorber element comprises a helical spring.

15. The escape capsule as in claim 13 wherein the shock absorber element comprises a shock absorber cylinder.

16. The escape capsule as in claim 11 wherein the interior of the escape capsule housing is provided with cushioning means for protecting the occupants of the escape capsule housing.

17. The escape capsule as in claim 16 wherein the cushioning means comprises at least one compressed air bag.

18. The escape capsule as in claim 16 wherein the interior of the capsule housing is padded.

* * * * *